United States Patent [19]

Albertson

[11] Patent Number: 4,546,831

[45] Date of Patent: Oct. 15, 1985

[54] SIDEWALK AND CURB CREVICE WEEDER

[76] Inventor: Edward Albertson, 1070 W. Oceanview Ave., Norfolk, Va. 23503

[21] Appl. No.: 521,845

[22] Filed: Aug. 10, 1983

[51] Int. Cl.⁴ .......................... A01B 1/16; A01B 1/20
[52] U.S. Cl. .................................... 172/13; 172/375; 172/381
[58] Field of Search ............... 172/13, 371, 375, 378, 172/381; 294/49, 50.6, 51, 55; D8/7, 10, 11

[56] References Cited

U.S. PATENT DOCUMENTS

| | | | |
|---|---|---|---|
| 465,448 | 12/1891 | Bostwick | 172/375 |
| 801,978 | 10/1905 | Garner | 172/375 |
| 878,920 | 2/1908 | Williams | 172/375 |
| 884,416 | 4/1908 | Poindexter | 172/13 |
| 1,018,073 | 2/1912 | Nelson | 172/13 |
| 1,147,027 | 7/1915 | Krogstad | 172/375 |
| 1,549,042 | 8/1925 | Masters | 172/371 |
| 1,633,318 | 6/1927 | Drish | 172/13 |
| 1,699,071 | 1/1929 | Kinney | 172/13 |
| 1,876,979 | 9/1932 | Larson | 172/13 |
| 1,954,854 | 4/1934 | Vonderahe | 172/371 |
| 2,203,159 | 6/1940 | Klopfenstein | 172/375 |
| 2,563,031 | 8/1951 | Gordon | 172/13 |
| 2,899,001 | 8/1959 | Paris | 172/13 |
| 3,029,878 | 4/1962 | McCulley | 172/13 |
| 3,293,674 | 12/1966 | Sapia | 172/371 X |
| 3,847,226 | 11/1974 | Long | 172/371 |
| 3,921,725 | 11/1975 | Trufor et al. | 172/375 |
| 4,177,864 | 12/1979 | Donnini | 172/371 |

FOREIGN PATENT DOCUMENTS

| | | | |
|---|---|---|---|
| 21337 | 10/1935 | Australia | 172/375 |
| 118424 | 5/1944 | Australia | 172/371 |
| 436897 | 9/1925 | Fed. Rep. of Germany | 172/375 |
| 84236 | 9/1935 | Sweden | 172/375 |
| 11046 | of 1901 | United Kingdom | 172/375 |
| 622322 | 4/1949 | United Kingdom | 172/375 |
| 455721 | 2/1975 | U.S.S.R. | 172/371 |

Primary Examiner—Richard T. Stouffer
Attorney, Agent, or Firm—Parkhurst & Oliff

[57] ABSTRACT

A crack and crevice weeder device for cleaning undesirable growth from cracks or crevices in sidewalks and expansion joints between sidewalk and street. A V-shaped cutting head is attached to an end of an U-shaped steel rod and a triangular-shaped scraper is attached to a point on the U-shaped rod. The U-shaped rod is fixed to a long handle which enables an operator, while standing, to remove undesirable growth from cracks, crevices or expansion joints by pulling the weeder towards him while simultaneously applying a downward pressure.

13 Claims, 8 Drawing Figures

SIDEWALK AND CURB CREVICE WEEDER

BACKGROUND OF THE INVENTION

The present invention relates to a device for cleaning undesirable growth from cracks or crevices in sidewalks and expansion joints between sidewalk and street. More particularly, the present invention is a device for quickly, efficiently, and thoroughly removing undesirable growth from cracks, crevices, and expansion joints, utilizing a V-shaped cutting head and a triangular-shaped scraper, mounted near the V-shaped cutting head.

The general idea of attempting to provide a tool for weeding purposes has been attempted, as indicated, for example, by Williams U.S. Pat. No. 878,920, Krogstad U.S. Pat. No. 1,147,027, Vonderahe U.S. Pat. No. 1,954,854, Sapia U.S. Pat. No. 3,293,674, and Long U.S. Pat. No. 3,847,226. However, none of those prior weeding devices provide the structure and efficient weeding action of the device of the present invention. Williams discloses a hoe-type tool provided with one or both of the side edges of a hoe blade with an auxiliary cutting edge. Krogstad discloses a rake-like weeding tool used in open areas to cultivate soil and cut weeds therefrom. Sapia and Long both disclose notched, flat bladed, weeders which utilize a pivoting motion for pulling weeds from the soil. Vonderahe also discloses a notched, flat bladed weeder, which when used is pulled towards the operator.

However, such prior devices suffer a variety of defects which make them inefficient and impractical for cleaning cracks, crevices, or expansion joints, which occur in a sidewalk or between curbs and street surfaces. For example, none of the prior art devices disclose a weeding tool having a sharply V-shaped profile at the working end of the hook portion of the device. Therefore, none of the prior art devices can efficiently clean undesirable growth which occurs in cracks, crevices, or expansion joints of a sidewalk.

SUMMARY OF THE INVENTION

The present invention overcomes the foregoing drawbacks. It is accordingly an object of this invention to provide a sidewalk and curb crevice weeder device which fits into cracks, crevices, or expansion joints of a sidewalk or between curbs and street surfaces, and through a pulling motion thereby quickly and completely cleans undesirable growth therefrom.

To obtain the above objects, a sidewalk and curb crevice weeder comprises:

a sidewalk and curb crevice weeder for removing undesirable growth occurring in cracks, crevices and expansion joints of sidewalks and sidewalk-curb interfaces, comprising:

a V-shaped cutting head mounted on an end of a U-shaped steel rod, said V-shaped cutting head having a pointed base portion and two leg portions, each of said leg portions having first ends which are joined together to form said pointed base portion and second ends which are free ends, said second ends being further from the U-shaped rod than said pointed base portion, whereby said pointed base portion and two leg portions form a sharpened concave leading edge for catching and cutting undesirable growth therein;

a triangular-shaped scraper may be mounted near the bottom of the U-shaped steel rod, having at least one of its outer sharpened points forming an angle with the plane of the scraper;

the "U-shaped" steel rod is connected to a handle of appropriate strength, length and diameter, by a metal ferrule.

BRIEF DESCRIPTION OF THE DRAWINGS

The above objects, features and advantages of the present invention will become more apparent from reading the following description of the preferred embodiments taken in connection with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
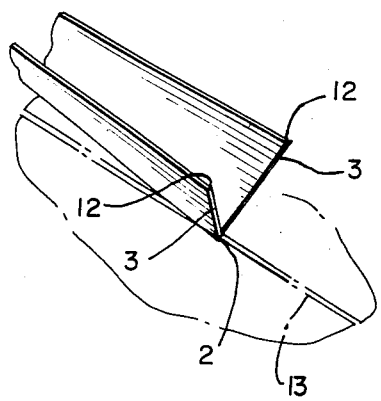
FIG. 1 is a perspective view of the V-shaped cutting head of the weeder, according to the present invention.
Figure 2:
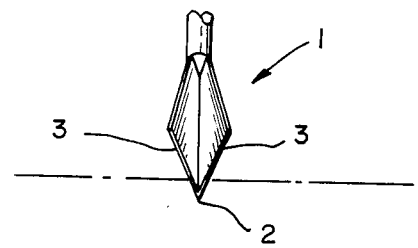
FIG. 2 is a front view of the V-shaped cutting head of the weeder, according to the present invention.
Figure 3:
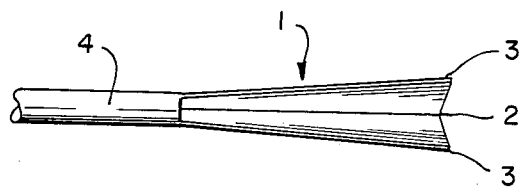
FIG. 3 is a top view of the V-shaped cutting head of the weeder, according to the present invention.

FIGS. 1 through 3, disclose the shape of the V-shaped cutting head of the sidewalk and curb crevice weeder. The V-shaped cutting head design permits the cutting head 1 to go into and between crevices 13 occurring in sidewalks, and curb/street joints 11; thereby to remove undesirable growth 9 therefrom. The V-shaped cutting head 1 comprises a sharp, concave leading edge which grabs and cuts the weeds and grass 9 growing in a crevice 13. The sharp, concave leading edge is formed from a pointed base portion 2 and two leg portions 3. Each of the leg portions 3 have first ends which are joined together to form said pointed base portion 2 and second ends 12 which are free ends, said second ends 12 being further from the U-shaped rod 4 than said pointed base portion 2 such that when the sharp concave leading edge is in its use position, the "V" edge does not lie in a vertical plane, but the pointed base portion 2 of the "V" is somewhat farther away from the user than the second ends 12 of the V-shaped cutting head 1.

Figure 4:
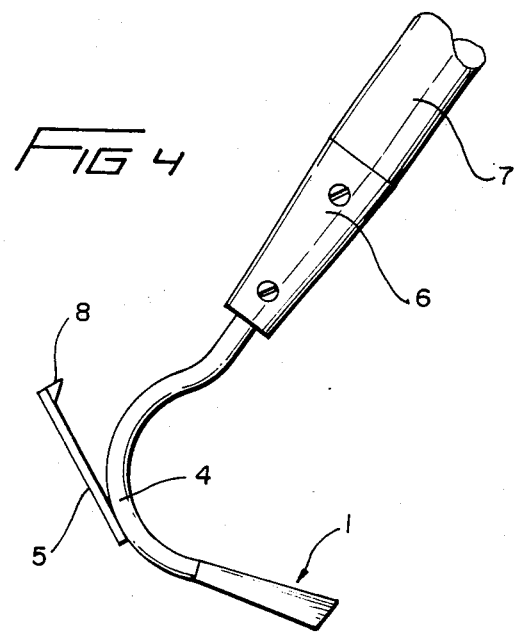
FIG. 4 is the end portion of the weeder showing the relative positioning of the triangular shaped scraper in relation to the V-shaped cutting head.
Figure 5:
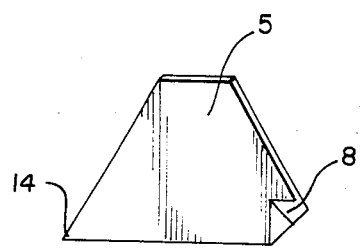
FIG. 5 shows a scaled view of the triangular shaped scraper.
Figure 6:
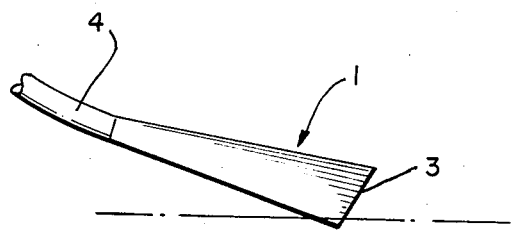
FIG. 6 is a schematic applicational view of the V-shaped cutting head weeder.

FIG. 4 shows the relative positioning of the V-shaped cutting head 1 on a U-shaped steel rod 4. The U-shaped bend permits the weeder operator to remain in a standing position while pulling the V-shaped cutting head 1 towards him. The U-shaped steel rod 4 is fixed to a wooden handle 7 by a metal ferrule 6 or any other suitable means. FIG. 4 also discloses the relative positioning of a triangular shaped scraper 5, which can be mounted on a bottom portion of the "U" on the U-shaped steel rod 4. The triangular shaped scraper 5 is further disclosed in FIG. 5. The triangular shaped scraper 5 is attached, by welding or any other suitable means, to the U-shaped steel rod 4. One of the outward points 8 of the triangular shaped scraper is bent in towards the U-shaped steel rod 4. The triangular shaped scraper 5 is utilized by rotating the wooden weeder handle approximately 180° from the V-shaped cutting head application, thereby placing the triangular shaped scraper 5 in contact with a sidewalk or road surface.

Figure 8:
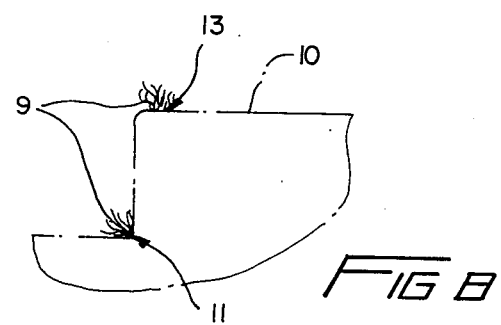
FIG. 8 shows two intended applications for the weeder.

The triangular shaped scraper 5 performs two separate functions. If a crack or crevice 13 is extremely narrow, too narrow for the V-shaped cutting head 1 to fit in, either pointed end 8 or 14 of the triangular shaped scraper 5 can be used to clean undesirable growth 9 therefrom. Also, the triangular shaped scraper 5 can be used to clean undesirable growth 13 occurring in the 90° intersection 11 between a curb and street, as shown in FIG. 8. To perform this function, the triangular shaped scraper 5 rests on the flat edge which connects the two outward points 8 and 14, and slides along the street with one of the pointed corners of the scraper in contact with the 90° expansion joint 11 occurring between the street and the curb. Again, the operator pulls the weeder in a direction toward him, while keeping the scraper in simultaneous contact with the street and curb, thereby eliminating undesirable growth therefrom.

Figure 7:
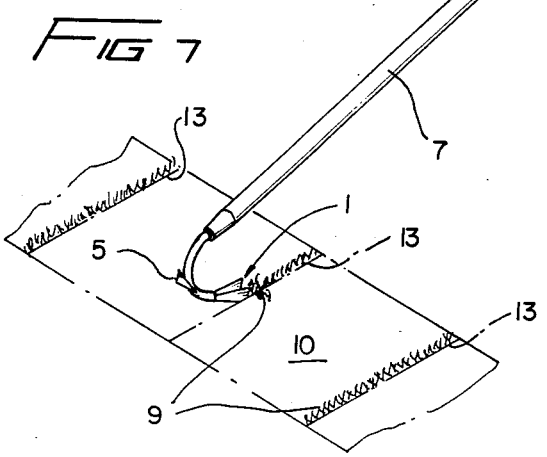
FIG. 7 is a general perspective applicational view of the sidewalk and curb weeder device of the present invention.

FIG. 7 shows a perspective view of the various applications of the sidewalk and curb crevice weeder and FIG. 8 shows a side view of undesireable growth which can be removed by the sidewalk and curb weeder. To operate the weeder device, utilizing the V-shaped cutting head 1, one places the pointed base portion 2 of the V-shaped cutting head 1 into a crack or crevice 13 which is desired to be cleaned. The operator, while in a standing position, pulls the V-shaped cutting head 1 towards him, while applying downward pressure, thereby allowing the tool to slide along the inside of the expansion joint 11 or crevice 13, resulting in undesirable growth being easily removed therefrom. However, if the crevice 13 is too narrow to allow entry of the pointed base portion 2, of the V-shaped cutting head 1, then the operator simply rotates the wooden handle approximately 180° and thereby places the sharply pointed end 8 or 14 of the triangular scraper 5 in contact with the crevice 13 and uses a similar pulling motion, while in a standing position, to eliminate the undesirable growth 9 from the crevice. Similarly, undesirable growth 9 occurring between the curb and the street is eliminated through the operator's pulling motion of the weeder towards him, while keeping the straight portion of the triangular shaped scraper 5 in contact with the street and either pointed portion 8 or 14 of the triangular shaped scraper 5 in contact with the curb, thereby eliminating undesirable growth 9 therefrom.

While various proportions and alternate elements or embodiments of the present invention may occur to those skilled in the art, such alternate dimensions, elements, or embodiments, when within the spirit of the present disclosure and the scope of the following claims, are considered to be part of the disclosed sidewalk and curb crevice weeder of the present invention.

What is claimed is:

1. A sidewalk and curb crevice weeder for removing undesireable growth occurring in cracks, crevices and expansion joints of sidewalks and sidewalk-curb interfaces, comprising:
   a V-shaped cutting head at one end of a U-shaped rod;
   the V-shaped cutting head having a sharpened concave leading edge for catching and cutting undesireable growth therein, a pointed bottom of said V-shaped cutting head extending toward the exterior of the U-shaped rod;
   a triangular-shaped scraper mounted near a bottom portion of the U-shaped rod, having at least one of its outer sharpened points forming an angle with the plane of the scraper; and
   a second end of the U-shaped rod is connected to a handle by which the leading edge of the V-shaped cutting head may be drawn in and along cracks and crevices.

2. The apparatus of claim 1, wherein the U-shaped rod, the V-shaped cutting head and the triangular-shaped scraper comprise hardened steel.

3. The apparatus of claim 1, wherein the handle is of sufficient length whereby the user may stand upright while pulling the weeder towards him.

4. The apparatus of claim 1, wherein the triangular-shaped scraper is mounted to the U-shaped rod, with a portion of the scraper, corresponding to a line between one point of the triangle and the midpoint of the side opposite said point, lying in a plane substantially parallel to the axis of the U-shaped rod.

5. The apparatus of claim 1, wherein one of the outer sharpened points of the triangular-shaped scraper is bent towards the handle.

6. The apparatus of claim 1, wherein a hole is drilled in the end of the handle and the other end of the U-shaped rod is inserted therein.

7. The apparatus of claim 1, wherein the U-shaped rod is connected to the handle by a metal ferrule.

8. The apparatus of claim 1, wherein the U-shaped rod is fixed to the handle by a metal ferrule, and the metal ferrule is fixed to the handle by screws which extend into the handle.

9. A sidewalk and curb crevice weeder for removing undesirable growth occurring in cracks, crevices and expansion joints of sidewalks and sidewalk-curb interfaces, comprising:
   a V-shaped cutting head at one end of a U-shaped rod, said V-shaped cutting head having a pointed base portion and two leg portions, each of said leg portions having first ends which are joined together to form said pointed base portion and second ends which are free ends, said second ends being further from the U-shaped rod than said pointed base portion, whereby said pointed base portion and two leg portions form a sharpened concave leading edge for catching and cutting undesirable growth therein, the pointed base portion of said V-shaped cutting head extending toward the exterior of the U-shaped rod; and
   a second end of the U-shaped rod is connected to a handle by which the leading edge of the V-shaped cutting head may be drawn in and along cracks and crevices.

10. The apparatus of claim 9 wherein a hole is drilled in an end of the handle and said other end of the U-shaped rod is inserted therein.

11. The apparatus of claim 10 wherein the U-shaped rod is connected to the handle by a metal ferrule.

12. The apparatus of claim 11 wherein the metal ferrule is fixed to the handle by screws which extend into the handle.

13. The apparatus of claim 12, wherein a triangular-shaped scraper is mounted near a bottom portion of the U-shaped rod, having at least one of its outer sharpened points forming an angle with the plane of the scraper.

* * * * *